Figure 4:
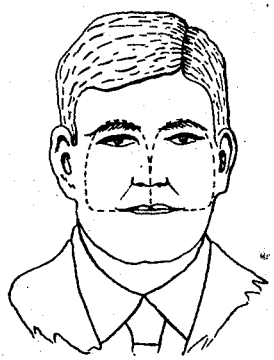

Dec. 22, 1925.
N. S. ESSIG
DENTAL DELINEATOR
Filed March 15, 1920 2 Sheets-Sheet 1
1,566,661
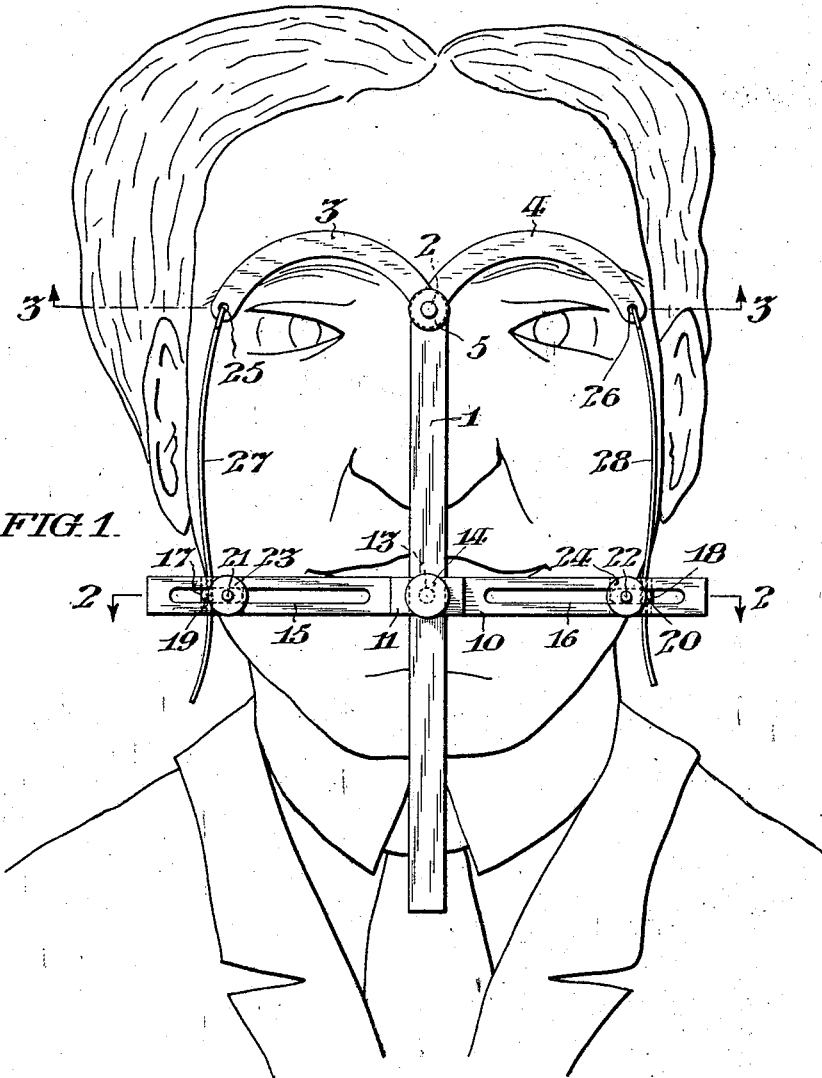
FIG. 1.
FIG. 2.
FIG. 3.
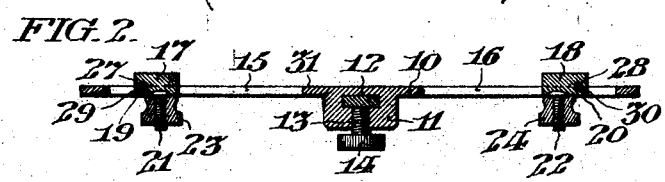
Inventor
Norman S. Essig Dec. 22, 1925.   1,566,661
N. S. ESSIG
DENTAL DELINEATOR
Filed March 15, 1920   2 Sheets-Sheet 2

Inventor
Norman S. Essig,
By Clifton C. Hallowell
Attorney

Witness
Elsie F. Jentzsch.

Patented Dec. 22, 1925.

1,566,661

UNITED STATES PATENT OFFICE.

NORMAN S. ESSIG, OF PHILADELPHIA, PENNSYLVANIA, ASSIGNOR TO THE S. S. WHITE DENTAL MANUFACTURING COMPANY, A CORPORATION OF PENNSYLVANIA.

DENTAL DELINEATOR.

Application filed March 15, 1920. Serial No. 366,073.

*To all whom it may concern:*

Be it known that I, NORMAN S. ESSIG, a citizen of the United States, and a resident of Philadelphia, county of Philadelphia, State of Pennsylvania, have invented certain new and useful Improvements in Dental Delineators, of which the following is a specification, reference being had to the accompanying drawings.

My invention relates particularly to devices for delineating the characteristic contours of the human face, and is especially designed to determine the type of artificial teeth best adapted to the general characteristics of the face of the patient under operation.

It has been found that human natural teeth vary in different individuals, particularly in their shape and size, and that they may be generally classified into three types; namely, rectangular, triangular and ovate; and that the respective types and their modifications produce the most esthetic results in the mouths of individuals whose faces have characteristic contours that tend to be straight or square, converging or triangular, and round or oval respectively.

The principal objects of my invention are to provide an implement that may be adjusted to substantially conform to the characteristic contours of the human face, and be utilized to indicate the type and size of teeth that may be best employed to produce the esthetic results desired.

Other objects of my invention are to provide an implement which is so constructed as to not interfere with the clear vision of the operator, whereby adjustments may be made to delineate the contour lines of the face with absolute accuracy, and which is provided with means for locking the adjustable parts in adjusted position to preserve the outlines thus delineated.

My invention further comprehends an implement having strands of pliant material conformable to the contour lines of the human face and cooperative with the adjustable parts to depict the character of teeth best adaptable to the characteristics of said face.

The form of my invention as hereinafter described, comprises a frame having a frame-bar or standard, carrying at one end laterally extended curved arms adjustable with respect to said frame-bar, and also having mounted thereon a transversely disposed cross-bar, arranged for longitudinal adjustment on said frame-bar, and having adjustable slide-blocks independently movable longitudinally on said cross-bar toward and from said frame-bar.

My invention also includes all of the various novel features of construction and arrangement as hereinafter more definitely specified.

Figure 5:
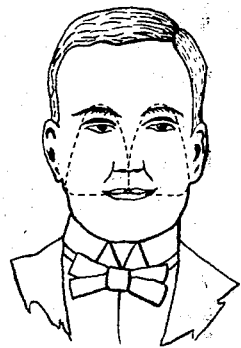
Figure 6:
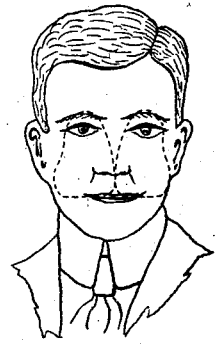
Figure 7:
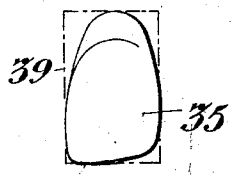
Figure 8:
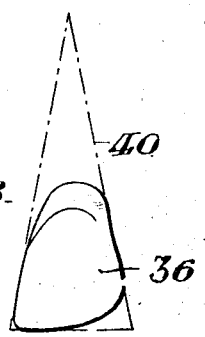
Figure 9:
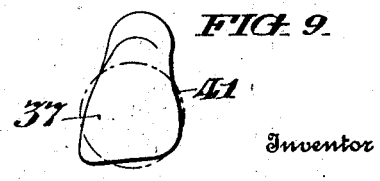

In the accompanying drawings, Figure 1 is a front elevational view of a dental delineator constructed in accordance with my invention and shown applied to a human face; Fig. 2 is a transverse sectional view taken longitudinally through the center of the cross-bar on the line 2—2 in Fig. 1; certain of the parts being shown in elevation for convenience of illustration; Fig. 3 is a transverse sectional view of said delineator taken on the line 3—3 in Fig. 1; Fig. 4 is an illustration of the human face having characteristics with which the rectangular type of tooth may be best associated; Fig. 5 is an illustration of the human face to which the converging or triangular type of tooth may best conform; Fig. 6 is an illustration of the human face in which the round or oval type of tooth will produce the most esthetic results; Fig. 7 illustrates a central incisor tooth of the first mentioned type; Fig. 8 illustrates a central incisor tooth of the second-mentioned type; and Fig. 9 illustrates a central incisor tooth of the third-mentioned type.

Teeth regarded singly are not symmetrical, whereas the face of the average human being for all practical purposes is symmetrical, unless there be a deformity. Therefore, to obtain a bilateral symmetry and to maintain harmony, teeth should be selected in pairs; the upper centrals being the guide.

It is obvious, therefore, that the best results may be attained by selecting a portion of the face having a characteristic bilateral symmetry at a region nearest the teeth themselves. The region of the face from which true harmonious lines should be taken is from the arch of the eyebrow to a line drawn across the face, through and parallel with the commissure of the mouth, which will represent the line of the cutting or incisal edge, the eyebrows suggesting the necks of the teeth, the center of the nose being the medial line, and the outline of the foreface simulating the disto-proximal outline of the incisor teeth, as represented in Figs. 4, 5 and 6, respectively showing in dotted lines the square, triangular and ovate types.

It will be found that the outlines confined within these measurements embracing the most characteristically expressive facial area, will suggest the outline for the selection of artificial incisor teeth, which will properly harmonize with the general outlines of the face.

In the accompanying drawings, the delineator comprises the frame-bar or standard 1, having pivoted at its upper end upon the pintle 2, the laterally extended upwardly curved arms 3 and 4, which are relatively adjustable about the axis of said pintle with respect to each other and the frame-bar 1, and may be locked in adjusted position by the thumb-nut 5, which is in threaded engagement with said pintle 2 whose head 6 bears against the outer surface of the arm 4.

The frame-bar or standard 1 also carries the cross-bar 10 which is slidably mounted thereon, being provided with a boss 11 having the aperture 12 through which said frame-bar extends. Said boss is provided with a threaded aperture for the thumb-screw 13, having the knurled head 14 by which said cross-bar 10 is engaged with said frame-bar 1 in any adjusted position.

The cross-bar 10 is provided with the slots 15 and 16 and carries slide-blocks 17 and 18, respectively having elongated projections 19 and 20 slidably engaged in said slots, from which projections threaded studs 21 and 22 extend for the engagement of the thumb-nuts 23 and 24, which are arranged to lock said slide-blocks in different adjusted positions on said cross-bar 10 with respect to the frame-bar or standard 1.

The curved arms 3 and 4 respectively have the apertures 25 and 26 for the engagement of pliant wires 27 and 28, which are engaged with the slide-blocks 17 and 18 by extending through apertures 29 and 30 therein, which apertures are slightly larger than said wires and overlap the plane of the inner surface 31 of the cross-bar 10, so that when the thumb-nuts 23 and 24 are rotated to lock said slide-blocks 17 and 18 in adjusted position on the cross-bar 10, the pliant wires 27 and 28 are pinched between the walls of the apertures 29 and 30 and the surface 31 of said cross-bar 10.

It will be obvious that the arms 3 and 4 and the cross-bar 10 may be respectively adjusted to substantially conform to the eyebrows and commissure of the mouth, and the pliant wires 27 and 28 may be conformed to the characteristic outlines of the foreface, and when engaged by locking the slide-blocks 17 and 18 on the cross-bar 10 will remain in the form to which they have been adjusted, so that when the delineator is removed from the face, said delineator may be utilized to determine the type of tooth best adapted to the face for producing the most esthetic results, by comparing the outlines thus delineated with the three primary types of teeth, 35, 36 and 37, illustrated in Figs. 7, 8 and 9. The tooth 35 is of the rectangular type and most nearly conforms to the rectangular figure 39 indicated by the dot and dash lines in Fig. 7; the tooth 36 is of the triangular type and most nearly conforms to the triangular figure 40, indicated by the dot and dash lines in Fig. 8; and the tooth 37 is of the circular or ovate form and most nearly conforms to the circular figure 41 indicated by the dot and dash lines in Fig. 9.

My invention is advantageous in that the characteristic lines of the face may be delineated and conveniently compared with the outlines of the primary types of teeth and their modifications, so that the type of tooth which is best adapted to produce the most esthetic results may be readily selected.

I do not desire to limit my invention to the precise details of construction and arrangement as herein set forth, as it is obvious that various modifications may be made therein without departing from the essential features of my invention as defined in the appended claims.

Having thus described my invention, I claim:—

1. A device of the class described, comprising a standard having laterally extended arms, a cross-bar adjustable longitudinally on said standard and extending laterally upon opposite sides thereof, and a pliant connection between the respective arms and said cross-bar, conformable to the contour lines of the human face.

2. A device of the class described, comprising a standard, a laterally-extended arm adjustably mounted on said standard, a cross-bar adjustable on said standard toward and from said arm, a slide-block on said cross-bar adjustable toward and from said standard, and a pliant connection between the end of said arm and said slide-block conformable to the contour lines of the human face.

3. A device of the class described, comprising a medial frame-bar, laterally-extended arms pivotally mounted for adjustment on said frame-bar, a slotted cross-bar slidably adjustable on said frame-bar, slide-blocks slidably movable in said slots toward and from said frame-bar, pliant wires connecting said arms and slide-blocks, and means for locking said slide-blocks and wires to said cross-bar in different adjusted positions.

4. A device of the class described comprising a medial frame-bar, a cross-bar slidably adjustable on said frame-bar, laterally extended curved arms pivotally mounted for adjustment on said frame-bar, and pliant means connecting the free ends of said curved arms with said cross-bar.

5. A device of the class described, comprising a frame having pivoted arms formed of articulated sections conformable to the contour lines of the human face, and means relatively movable into different spaced relation arranged to engage said arm and hold them in adjusted position.

In witness whereof, I have hereunto set my hand this 12th day of March, A. D., 1920.

NORMAN S. ESSIG.